United States Patent
Boersma et al.

(10) Patent No.: US 9,274,791 B2
(45) Date of Patent: *Mar. 1, 2016

(54) VERIFICATION OF A VECTOR EXECUTION UNIT DESIGN

(71) Applicant: INTERNATIONAL BUSINESS MACHINES CORPORATION, Armonk, NY (US)

(72) Inventors: Maarten J. Boersma, Holzgerlingen (DE); Udo Krautz, Stuttgart (DE); Ulrike Schmidt, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/109,221

(22) Filed: Dec. 17, 2013

(65) Prior Publication Data

US 2014/0156969 A1 Jun. 5, 2014

Related U.S. Application Data

(63) Continuation of application No. 13/674,573, filed on Nov. 12, 2012.

(51) Int. Cl.
  *G06F 15/78* (2006.01)
  *G06F 9/30* (2006.01)
  *G06F 11/16* (2006.01)

(52) U.S. Cl.
  CPC *G06F 9/30* (2013.01); *G06F 11/16* (2013.01); *G06F 11/1629* (2013.01); *G06F 11/1641* (2013.01)

(58) Field of Classification Search
  None
  See application file for complete search history.

(56) References Cited

U.S. PATENT DOCUMENTS

| | | | |
|---|---|---|---|
| 5,859,962 A * | 1/1999 | Tipon et al. | 714/33 |
| 6,249,893 B1 * | 6/2001 | Rajsuman et al. | 714/741 |
| 6,434,196 B1 * | 8/2002 | Sethuraman et al. | 375/240.12 |
| 7,415,700 B2 | 8/2008 | Pomaranski et al. | |
| 8,122,077 B2 | 2/2012 | Ziv | |
| 8,918,747 B2 * | 12/2014 | Boersma et al. | 716/106 |
| 2004/0078556 A1 * | 4/2004 | Spracklen | 712/223 |
| 2005/0055608 A1 * | 3/2005 | Shidla et al. | 714/25 |
| 2006/0190700 A1 * | 8/2006 | Altman | G06F 11/1641 712/7 |
| 2008/0040587 A1 * | 2/2008 | Burke et al. | 712/227 |
| 2008/0172551 A1 | 7/2008 | Yamashita et al. | |
| 2008/0307275 A1 * | 12/2008 | Wong et al. | 714/719 |
| 2009/0183035 A1 * | 7/2009 | Butler | G06F 11/1645 714/48 |
| 2010/0293530 A1 | 11/2010 | Ivancic et al. | |
| 2011/0264990 A1 | 10/2011 | Sawada | |

(Continued)

OTHER PUBLICATIONS

'Are GPUs just vector processors?' by Eric Holk from theincredibleholk.wordpress.com, Oct. 26, 2012.*

(Continued)

*Primary Examiner* — Steven Snyder
(74) *Attorney, Agent, or Firm* — Maeve McCarthy (57) ABSTRACT

A method for verification of a vector execution unit design. The method includes issuing an instruction into a first instance and a second instance of a vector execution unit. The method includes issuing a random operand into a first lane of the first instance of the vector execution unit and into a second lane of the second instance of the vector execution unit. The method further includes receiving results from execution of the instruction and the random operand in both the first and the second instance of the vector execution unit and comparing the received results.

5 Claims, 5 Drawing Sheets

(56) References Cited

U.S. PATENT DOCUMENTS

| | | | | |
|---|---|---|---|---|
| 2013/0185544 | A1* | 7/2013 | Hung et al. | 712/225 |
| 2015/0058604 | A1* | 2/2015 | Arunagiri | G06F 11/16 |
| | | | | 712/227 |

OTHER PUBLICATIONS

'Verification of the IBM RISC System/6000 by a dynamic biased pseudo-random test program generator' by A. Aharon et al., IBM Systems Journal vol. 30, No. 4, 1991.*

'Testing for Interconnect Crosstalk Defects Using On-Chip Embedded Processor Cores' by Li Chen et al., DAC 2001, Jun. 18-22, 2001.*

'Mitigation of Crosstalk on the SDSL Upstream Transmission with Vector Equalization' by Liang C. Chu and Martin Brooke, copyright 2001, IEEE.*

Baumgartner et al., "Scalable Conditional Equivalence Checking: An Automated Invariant-Generation Based Approach" Formal Methods in Computer-Aided Design, FMCAD 2009, Nov. 15-18, 2009 [online], [retrieved on Jul. 4, 2012]. Retrieved from the Internet <URL: http://ieeexplore.ieee.org/stamp/stamp.jsp?tp=&arnumber=5351131>.

Baumgartner et al., "Scalable Sequential Equivalence Checking Across Arbitrary Design Transformations" International Conference on Computer Design, ICCD 2006, Oct. 1-4, 2007 [online], [retrieved on Aug. 29, 2012]. Retrieved from the Internet <URL: http://ieeexplore.ieee.org/stamp/stamp.jsp?tp=&arnumber=4380826>.

Harrison, "Floating-Point Verification" Journal of Universal Computer Science, vol. 13, No. 5, 2007, pp. 629-638 [online], [retrieved on Apr. 9, 2012]. Retrieved from the Internet <URL: http://citeseerx.ist.psu.edu/viewdoc/download?doi=10.1.1.103.1549&rep=rep1&type=pdf>.

Jacobi et al., "Automatic Formal Verification of Fused-Multiply-Add FPUs" Proceedings of the Design, Automation and Test in Europe Conference and Exhibition (Date'05), Mar. 2005 [online], [retrieved on Aug. 29, 2012]. Retrieved from the Internet <URL: http://ieeexplore.ieee.org/stamp/stamp.jsp?tp=&arnumber=1395772>.

Seidel, "Formal Verification of an Iterative Low-Power x86 Floating-Point Multiplier with Redundant Feedback" In Proceedings ACL2 2011, EPTCS 70, 2011, pp. 70-83 [online], [retrieved on Apr. 9, 2012]. Retrieved from the Internet <URL: http://arxiv.org/pdf/1110.4675.pdf>.

Van Eijk, "Sequential Equivalence Checking without State Space Traversal" Proceedings of Design, Automation and Test in Europe, Feb. 23-26, 1998 [online], [retrieved on Aug. 29, 2012]. Retrieved from the Internet <URL: http://ieeexplore.ieee.org/stamp/stamp.jsp?tp=&arnumber=655922>.

U.S. Appl. No. 13/674,573, filed Nov. 12, 2012.

* cited by examiner

FIG. 5 ssued Nov. 12,
VERIFICATION OF A VECTOR EXECUTION UNIT DESIGN

CROSS REFERENCE TO RELATED APPLICATION

This application is a Continuation application of pending U.S. patent application Ser. No. 13/674,573 filed Nov. 12, 2012.

FIELD OF THE INVENTION

The present invention relates generally to the field of formal verification methods, and more particularly to verification of a vector execution unit design.

BACKGROUND OF THE INVENTION

In the context of hardware and software systems, formal verification is the act of proving the correctness of algorithm designs using formal methods of mathematics. Formal verification has become a well-established practice in parts of the hardware design industry due to the ability of formal verification methods to deal with the increasing complexity of hardware systems, such as multi-core architectures. As a result of the subtle interactions between architectural components, it is difficult to exercise a realistic set of possibilities by simulation, which is the process often used to test a system design. Simulation, or model checking, explores a model of the hardware system being tested and determines whether the model meets a given specification. Simulation methods may be efficient at exposing bugs, but are based on incomplete methods which cannot achieve full evaluation of all operand combinations over all states. As a main alternative to simulation, formal verification proves the system design functions correctly on all possible inputs and closes the state space coverage gap encountered when using simulation.

SUMMARY

Embodiments of the present invention disclose a method, computer program product and computer system for verification of a vector execution unit design. The method includes issuing an instruction into a first instance and a second instance of a vector execution unit. The method includes issuing a random operand into a first lane of the first instance of the vector execution unit. The method includes issuing the random operand into a second lane of the second instance of the vector execution unit. The method further includes receiving results from execution of the instruction and the random operand in both the first and the second instance of the vector execution unit and comparing the received results.

DETAILED DESCRIPTION

As will be appreciated by one skilled in the art, aspects of the present invention may be embodied as a system or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
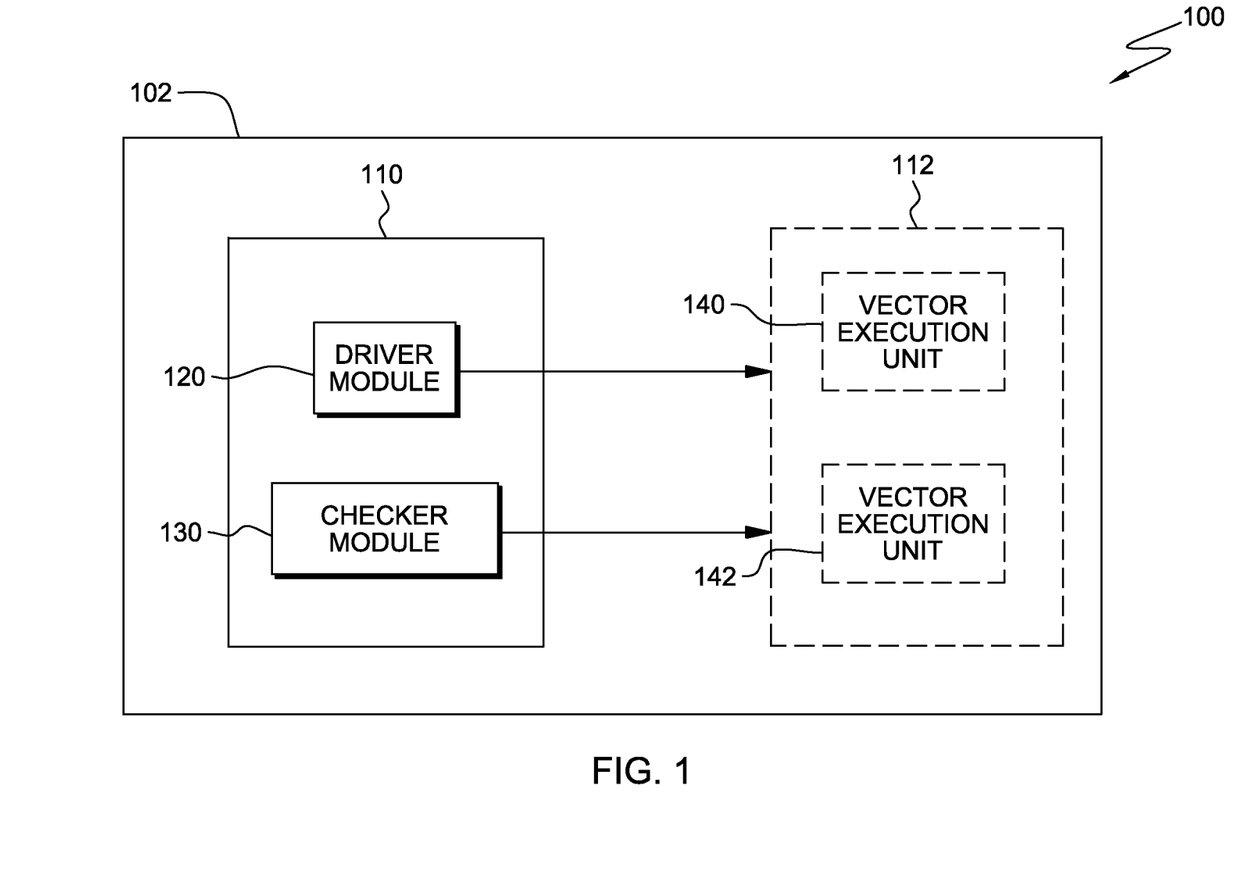
FIG. 1 is a functional block diagram illustrating a data processing system, in accordance with an embodiment of the present invention.

The present invention will now be described in detail with reference to the Figures. FIG. 1 is a functional block diagram illustrating a data processing system, generally designated 100, in accordance with one embodiment of the present invention.

Data processing system 100 includes verification environment 102, which includes verification module 110, containing driver module 120 and checker module 130, and multiple instances of a design under test (DUT), represented in design wrapper 112 in FIG. 1. Driver module 120 and checker module 130 can connect to design wrapper 112 and the multiple instances of a vector execution unit DUT, for example, vector execution unit (VEU) 140 and vector execution unit (VEU) 142.

VEU 140 and VEU 142 can process data simultaneously according to a selected instruction and provide results as output. While in FIG. 1, design wrapper 112 shows only two vector execution units (VEU 140 and VEU 142), one of skill in the art will appreciate that in other embodiments there can be multiple instances of a vector execution unit design located in the design wrapper. In various embodiments of the present invention, design wrapper 112 may contain multiple data processing elements that perform the same operation on multiple data points simultaneously as when, for example, executing single instruction, multiple data (SIMD) instructions.

Data processing system 100 is capable of running a formal verification computer program, for example, IBM Sixth-Sense, that can analyze verification environment 102. Data processing system 100 may be a server computer, a client computer, a notebook computer, a laptop computer, a tablet computer, a handheld computing device or smart-phone, a thin client, or any other electronic device or computing system capable of processing and executing machine readable program instructions. In another embodiment, data processing system 100 may be represented by a computing system utilizing clustered computers and components to act as a single pool of seamless resources when accessed through a network. This is a common implementation for datacenters and for cloud computing applications. Data processing system 100 may include internal and external components, as described in more detail below with reference to FIG. 5.

In this exemplary embodiment, driver module 120 generates program instructions and random operands and selects and issues an instruction, along with random selected operands, into parallel data lanes, for example, SIMD lanes, in multiple instances of a vector execution unit, for example, VEU 140 and VEU 142 in design wrapper 112. Driver module 120 applies the instruction both at initialized states, for example, value equal to zero, and random value states. Driver module 120 applies the selected instruction and the operands to a SIMD lane in a first instance of a vector execution unit, for example, VEU 140. Driver module 120 applies the same selected instruction and the same operands, simultaneously, to a second instance of a vector execution unit, for example, VEU 142, but in a different SIMD lane. In various embodiments of the present invention, the process may continue, for example, the same selected instruction and operands may be applied to a third or more instances of a vector execution unit. Checker module 130 connects to VEU 140 and VEU 142 in order to receive and compare the results from execution of the selected instruction in each active SIMD lane of VEU 140 and VEU 142.

Figure 2:
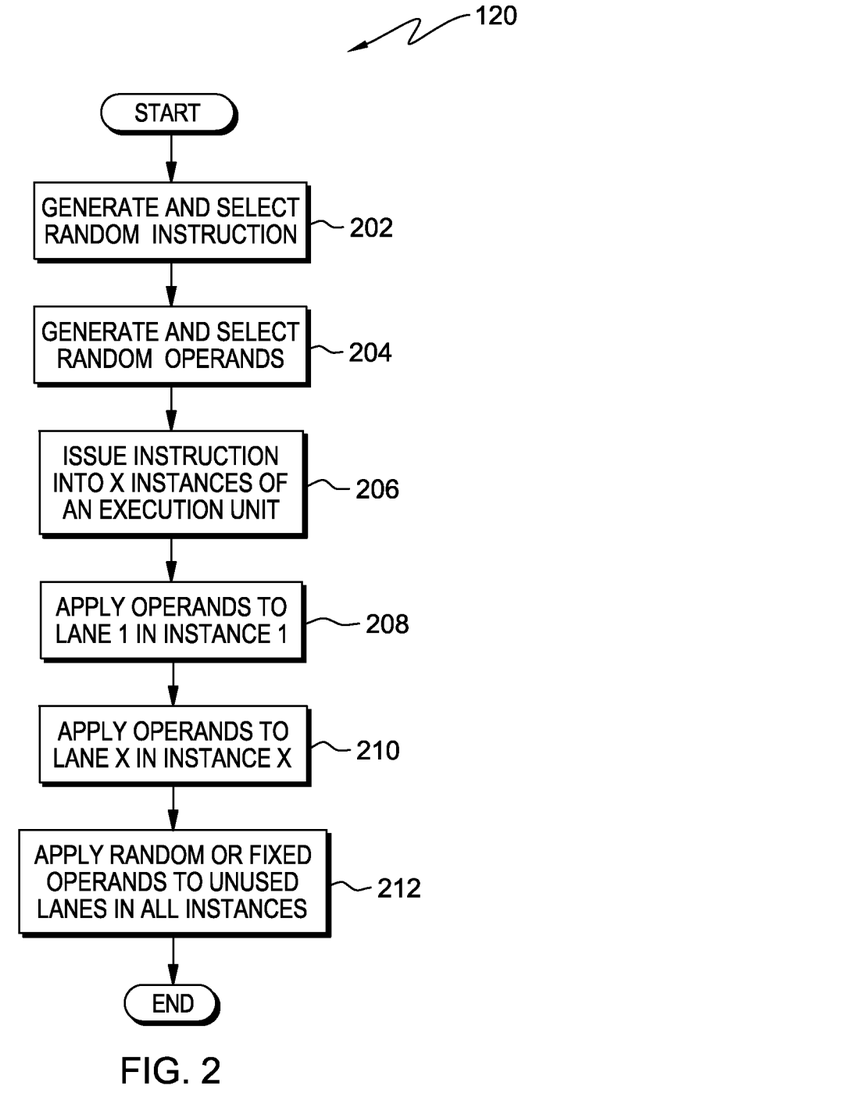
FIG. 2 is a flowchart depicting operational steps of a driver module for generating and issuing a random instruction and random data into multiple instances of a vector execution unit, in accordance with an embodiment of the present invention.

FIG. 2 is a flowchart depicting operational steps of driver module 120 for generating and issuing a random instruction and random data into multiple instances of a vector execution unit, in accordance with an embodiment of the present invention.

In an exemplary embodiment, driver module 120 generates and selects a random instruction (step 202) and random operands (step 204). Driver module 120 issues the selected instruction into multiple instances (X) of an execution unit (step 206). In a preferred embodiment, the selected instruction is applied to an instance of an execution unit under verification, for example, VEU 140, and the same selected instruction is applied to another instance of the execution unit, for example, VEU 142. VEU 140 and VEU 142 represent vector execution units that can execute instructions, for example, SIMD instructions, in two parallel data lanes (e.g., the instructions are two-way SIMD). In various embodiments of the present invention, the same selected instruction may be applied to more than two instances of a vector execution unit.

Driver module 120 applies the selected random operands to lane one of an instance one of a vector execution unit, for example, VEU 140 (step 208). Driver module 120 applies the same selected random operands to lane X in vector execution unit instance X, where X represents the number of lanes in the vector execution unit under verification and the number of instances of the vector execution unit design in design wrapper 112 (step 210). For example, if the vector execution unit under verification is X-way SIMD, design wrapper 112 may contain X instances of the vector execution unit. In an exemplary embodiment of the present invention, driver module 120 applies the same selected random operands to a vector execution unit with two-way SIMD execution, for example, lane two of VEU 142.

Driver module 120 applies selected random or fixed value operands to unused lanes in all instances of the vector execution unit design under verification (step 212). In an exemplary embodiment, driver module 120 applies the selected instruction and random operands, uncorrelated to the data in other lanes or instances, to one SIMD lane in each instance of the vector execution unit. In order to verify that disturbance does not occur due to the operation of an instruction in one SIMD lane of an instance of a vector execution unit by a computation in another lane of the same instance, random data is applied to the unused lanes. In various embodiments of the present invention, there may be X instances of an X-way SIMD vector execution unit and driver module 120 may issue random data into all lanes other than the one active SIMD lane.

Figure 3:
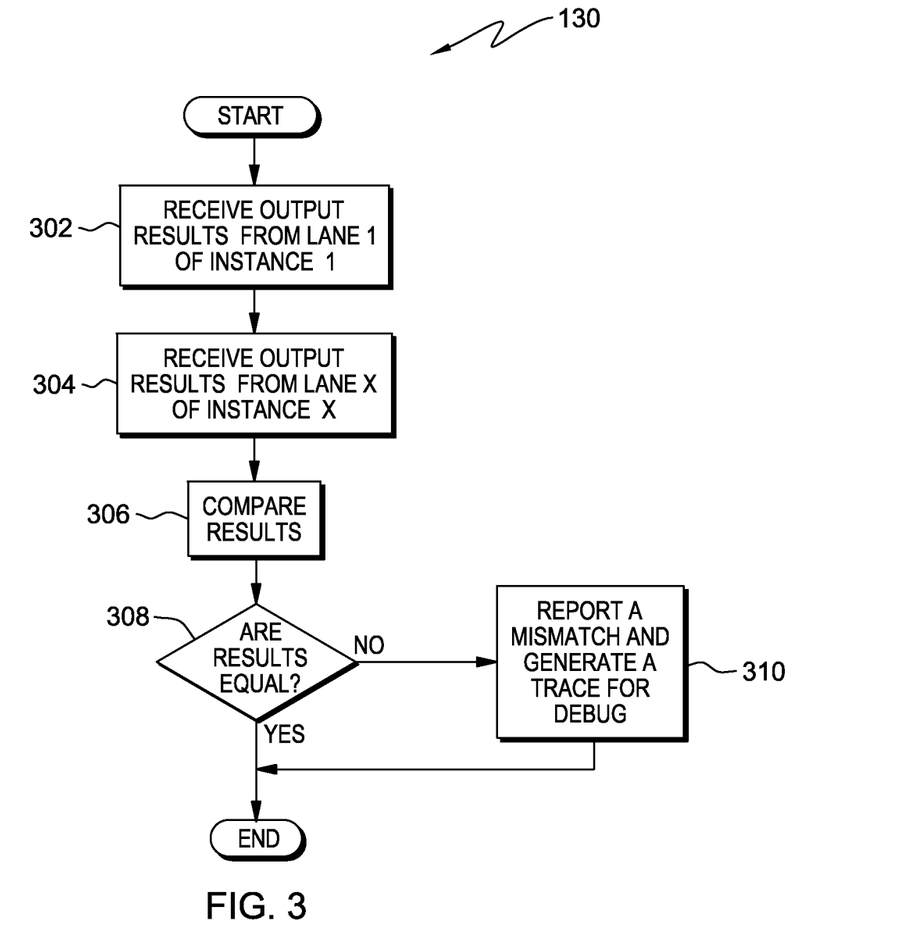
FIG. 3 is a flowchart depicting operational steps of a checker module for comparing results from execution of an instruction in multiple instances of a vector execution unit, in accordance with an embodiment of the present invention.

FIG. 3 is a flowchart depicting operational steps of checker module 130 for comparing results from execution of an instruction in multiple instances of a vector execution unit, in accordance with an embodiment of the present invention.

Checker module 130 receives output results from execution of the selected random instruction issued to SIMD lane one of instance one of a vector execution unit design under verification, for example, VEU 140 (step 302). Checker module 130, in an exemplary embodiment of the present invention, receives the output results from the execution of the selected random instruction in SIMD lane X of instance X of the vector execution unit, here, lane two of instance two of VEU 142 (step 304). Checker module 130 compares the results obtained from each of SIMD lane one and SIMD lane two against each other (step 306).

Checker module 130 determines if the results from execution of the selected instruction and random operands in the two SIMD lanes of two separate instances of a vector execution unit are equal (decision block 308). If the results are equal (decision block 308, yes branch), the lanes of the vector execution unit design are equivalent and verification of the vector execution unit design is complete. If the results are not equal (decision block 308, no branch), checker module 130 reports a mismatch and generates a trace for purposes of debugging (step 310).

Figure 4:
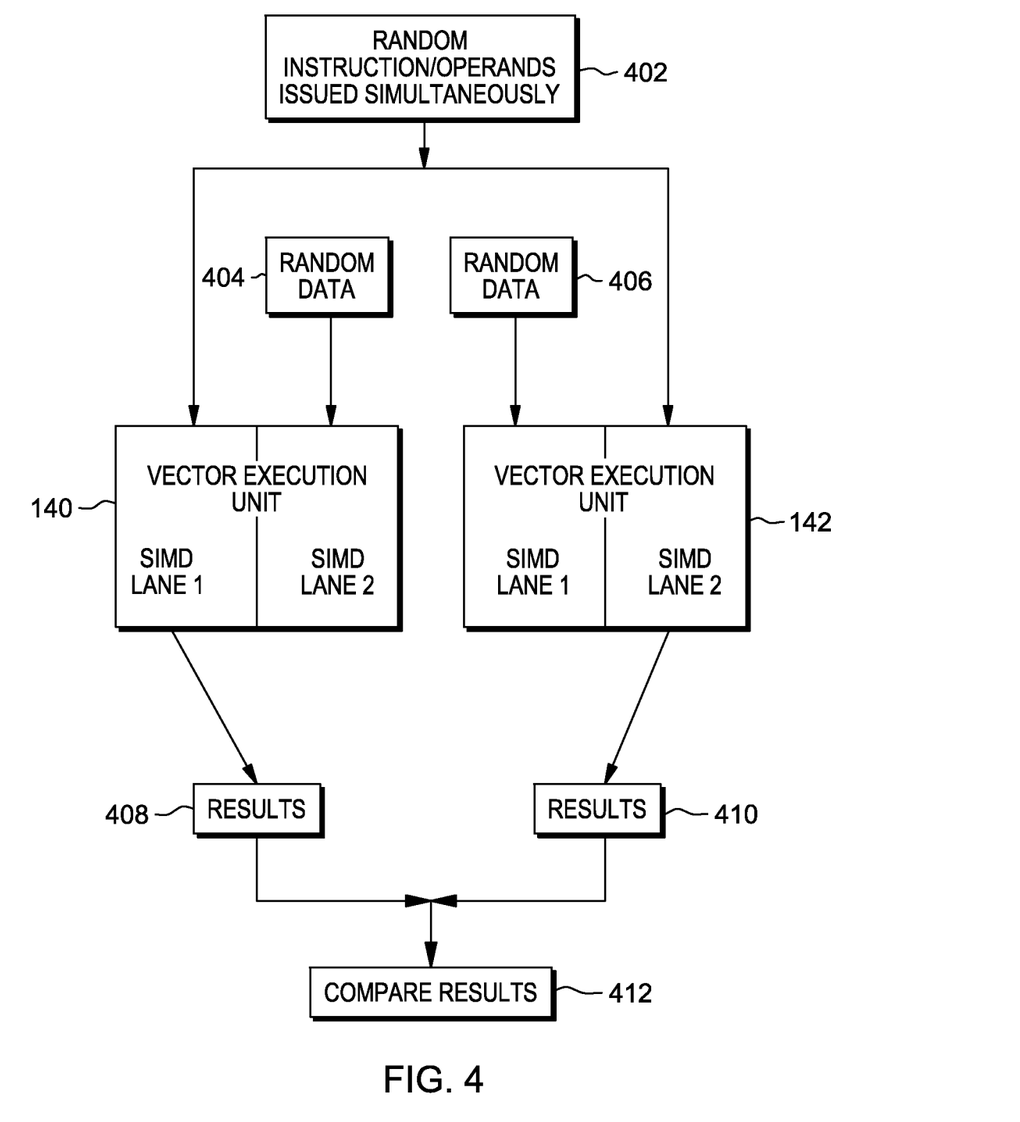
FIG. 4 is an exemplary data flow diagram illustrating the operation of the driver module of FIG. 2 and the checker module of FIG. 3, in accordance with an embodiment of the present invention.

FIG. 4 is an exemplary data flow diagram illustrating the operation of driver module 120 and checker module 130, in accordance with an embodiment of the present invention.

Driver module 120 (not shown) issues the random selected instruction and random operands simultaneously into multiple instances of a vector execution unit under verification (block 402). In an exemplary embodiment, the instruction and operands are issued into SIMD lane one of instance one of the vector execution unit, here VEU 140. The instruction and operands are issued into SIMD lane two of instance two of the vector execution unit, here VEU 142. Driver module 120 (not shown) issues uncorrelated random data 404 and random data 406 into unused lanes in each of the instances of the vector execution unit design under verification to verify a disturbance is not occurring. Results 408 and results 410 from execution of the instruction in each of SIMD lane one and two in each of the two instances are outputted. Checker module 130 (not shown) compares the results to each other (block 412) and if the vector execution unit design is correct, the results are equal. If the results are not equal, a trace is generated in order to debug the vector execution unit design, as discussed above with reference to FIG. 3.

Figure 5:
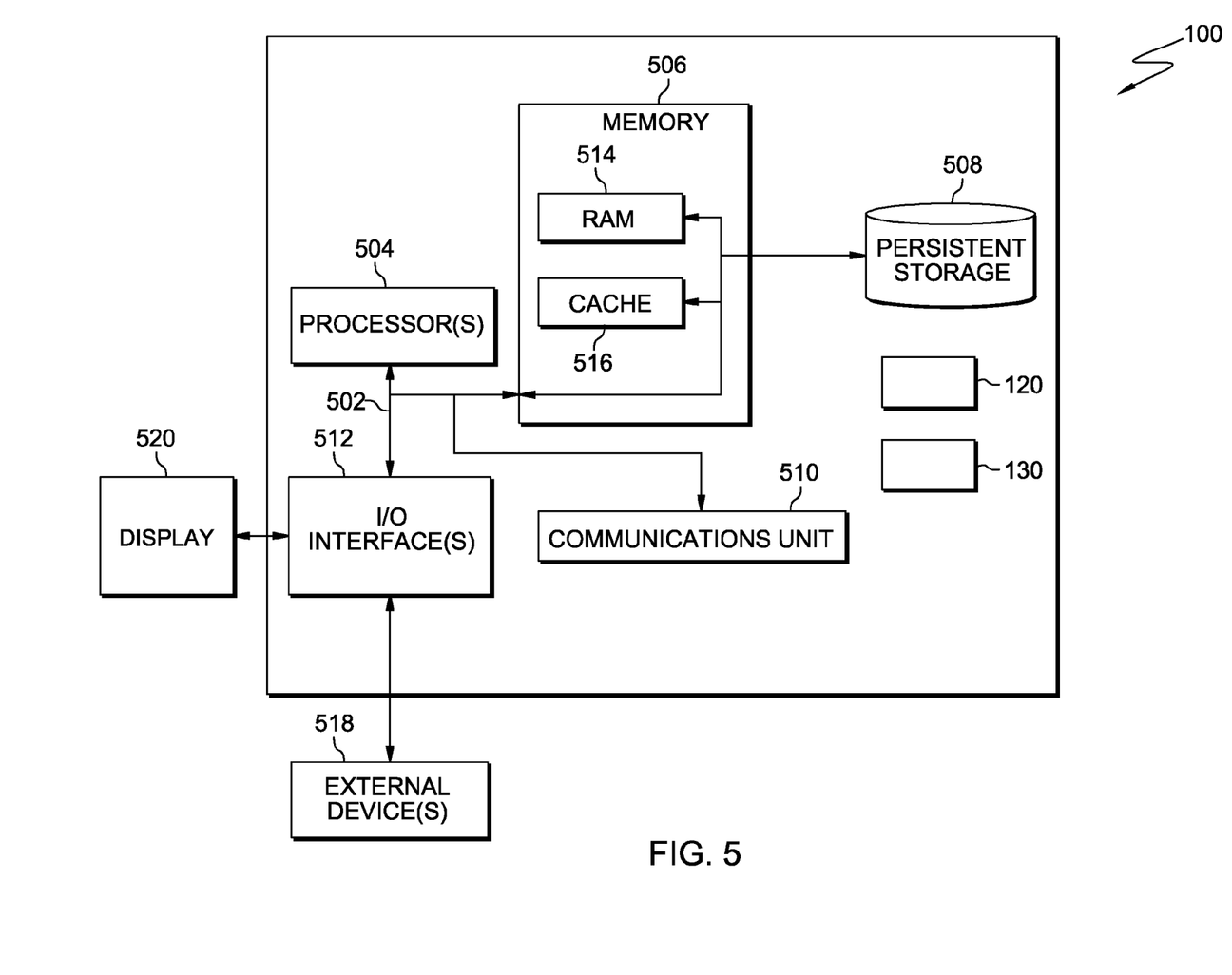
FIG. 5 depicts a block diagram of components of the data processing system of FIG. 1, in accordance with an embodiment of the present invention.

FIG. 5 depicts a block diagram of components of data processing system 100, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Data processing system 100 may include communications fabric 502, which can provide communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Driver module 120 and checker module 130 may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Driver module 120 and checker module 130 may be downloaded to persistent storage 508 through communications unit 510.

I/O interface(s) 512 can allow for input and output of data with other devices that may be connected to data processing system 100. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., driver module 120 and checker module 130, can be stored on such portable computer-readable storage media and can be loaded onto persistent storage 508 via I/O interface(s) 512. I/O interface(s) 512 may also connect to a display 520. Display 520 provides a mechanism to display data to a user and may be, for example, a computer monitor or an incorporated display screen, such as is used in tablet computers and smart phones.

The functions described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for verification of a vector execution unit design, the method comprising the steps of:
    issuing an instruction into a first instance of a vector execution unit;
    issuing the instruction into a second instance of the vector execution unit;
    issuing a random operand into a first lane of the first instance of the vector execution unit;
    issuing the random operand into a second lane of the second instance of the vector execution unit;
    inputting one or more random operands into one or more unused lanes of the first and the second instance of the vector execution unit;
    receiving results from execution of the instruction and the random operand in the first instance of the vector execution unit and results from execution of the instruction and the random operand in the second instance of the vector execution unit; and
    comparing the received results.

2. The method of claim 1, further comprising the steps of:
    issuing the instruction and the random operand into at least one different lane in at least one additional instance of the vector execution unit;
    receiving results from execution of the instruction and the random operand in the at least one additional instance of the vector execution unit; and
    comparing the results from execution of the instruction and the random operand in the at least one additional instance of the vector execution unit to the results from execution of the instruction and the random operand in the first instance of the vector execution unit and results from execution of the instruction and the random operand in the second instance of the vector execution unit.

3. The method of claim 2, further comprising the step of inputting random operands into unused lanes of the at least one additional instance of the vector execution unit.

4. The method of claim 1, wherein the step of comparing the received results further comprises one or more computer processors determining whether the results are equal and responsive to determining the results are equal, the one or more computer processors determining the lanes of the vector execution unit are equivalent.

5. The method of claim 4, wherein the step of determining whether the results are equal further comprises, responsive to determining the results are not equal, generating a trace.

* * * * *